Dec. 6, 1966  W. E. JENSEN ETAL  3,289,548
SERVO STROKE DIVIDER
Filed April 15, 1964
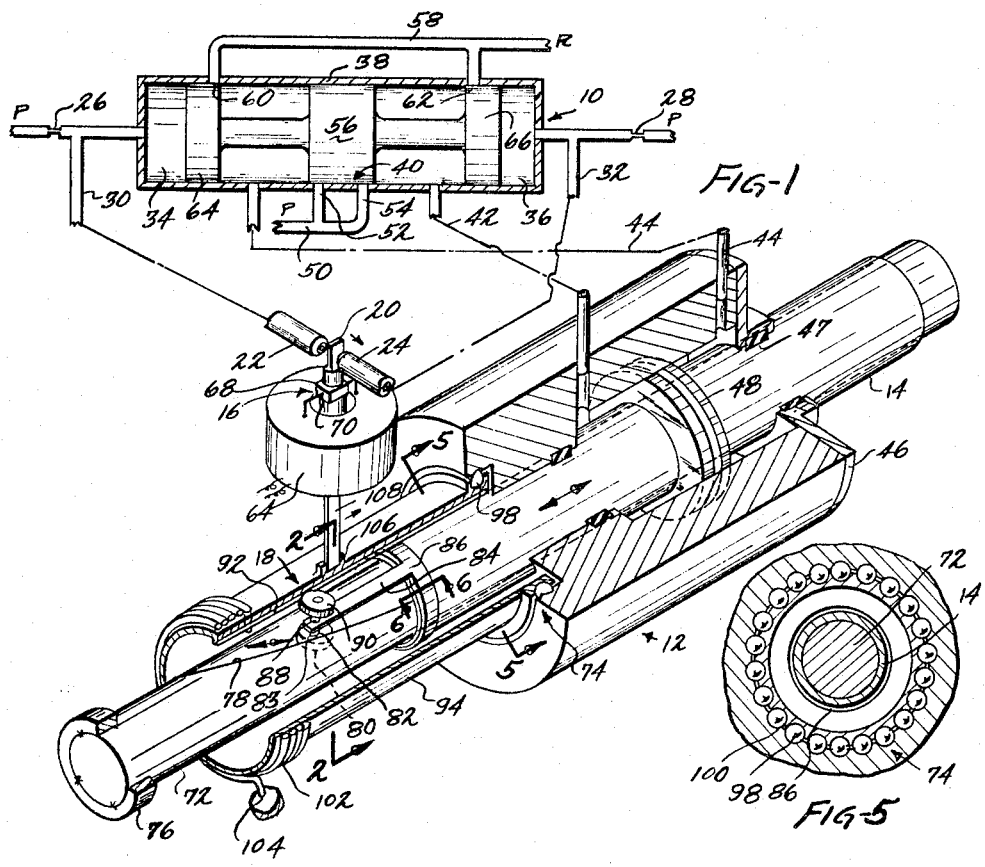
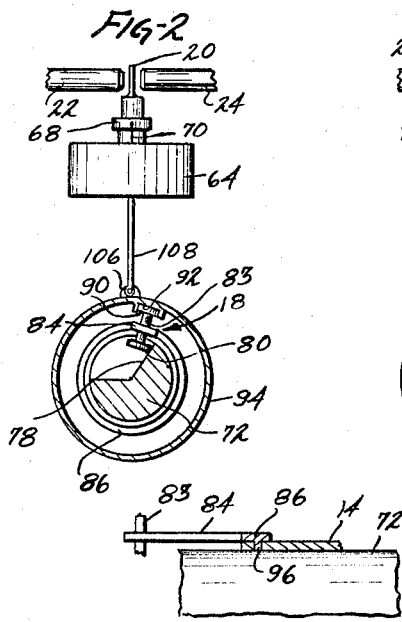
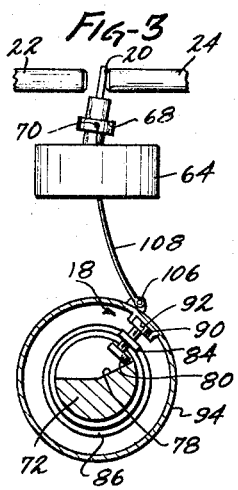
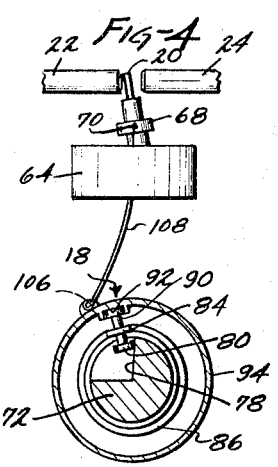
INVENTORS
WILLIAM E. JENSEN
GEORGE GROSS
HUGH A. MORRIS
BY Nilsson, Robbins & Anderson
ATTORNEYS United States Patent Office 3,289,548
Patented Dec. 6, 1966

3,289,548
SERVO STROKE DIVIDER
William E. Jensen, Tujunga, George Gross, Burbank, and Hugh A. Morris, Sepulveda, Calif., assignors to Bell Aerospace Corporation, a corporation of Delaware
Filed Apr. 15, 1964, Ser. No. 359,845
13 Claims. (Cl. 91—387)

The present invention relates to control systems and particularly to a mechanical control linkage that may be effectively employed as a feedback coupling in a hydraulic control system.

A wide variety of hydraulic control systems have been commonly used in the past. In general, these systems may function to position a mechanical member for example, in accordance with commands of a pressure or electrical signal. In applications of this type for hydraulic control systems, it has been somewhat conventional practice to derive a feedback or servo signal which varies as the mechanical member is displaced, which signal is applied to oppose the command signal. Feedback arrangements of this type stabilize the operation of the system, so as to provide effective control.

Various arrangements for accomplishing feedback have been employed in prior hydraulic systems. For example, electrical circuits have been used to carry electrical feedback signal information, and direct mechanical linkages have been used to directly apply a feedback force. In general, electrical feedback systems are complex and expensive. However, the advantages of greater simplicity in mechanical linkages have in the past generally been offset by certain disadvantages. For example, one rather severe problem attendant the use of mechanical feedback systems is the reduction of displacements by the controlled member, which are usually substantial, to a desired small, precise control motion or force. That is, for example, an actuator controlled by a hydraulic system may move within a range of many inches; however, accompanying feedback movements may desirably be relatively small, e.g. forces applied by displacements of small fractions of an inch. The accurate translation of the relatively large actuator movement to a small feedback control movement has thus presented a considerable problem.

Another difficulty involved in the use of mechanical feedback systems, is the special one of accommodating mechanical linkages to couple the actuator element for example, to the control element. Therefore, considerable need exists for a compact, effective mechanical feedback linkage, that has the capability to accurately translate (linearly or non-linearly) substantial movements by a controlled member into small movements for application to the control element of a control system.

Accordingly, it is an object of the present invention to provide a mechanical linkage that is responsive to a controlled movement to accurately provide a feedback movement, which linkage is simple, inexpensive to manufacture and maintain, and substantially overcomes the prior art disadvantages above referred to.

It is another object of the present invention to provide a hydraulic control system incorporating a mechanical feedback linkage which is economical of space and is accurate in operation to linearly or non-linearly translate motion for feedback purposes.

It is another object of the present invention to provide a mechanical feedback linkage, which is capable of accurately translating a given motion to a control motion having a scope that is a very small fraction of the scope of the given motion.

Other objects and advantages of the present invention will become apparent from a consideration of the following description, taken in conjunction with the accompanying drawing, which is presented by way of example only and is not intended as a limitation upon the scope of the present invention as defined in the appended claims, and in which:

FIGURE 1 is a sectionalized perspective and diagrammatic representation of a hydraulic control system constructed in accordance with the present invention.

FIGURE 2 is a sectional view taken along line 2—2 of FIGURE 1;

FIGURE 3 is a sectional view similar to that of FIGURE 2, showing the component parts in another stage of operation;

FIGURE 4 is a sectional view similar to that of FIGURE 2, showing the component parts in still another stage of operation;

FIGURE 5 is a fragmentry sectional view taken along line 5—5 of FIGURE 1; and

FIGURE 6 is a fragmentary sectional view taken along line 606 of FIGURE 1.

A hydraulic system in accordance with the present invention includes a hydraulic control structure for variously positioning an actuator in response to a command signal. A linear cam in mating engagement with a rotative arm assembly is connected to be positioned by the actuator, thereby variously rotating the arm assembly, a motion which is applied through a slidable coupling to the hydraulic control system as mechanical feedback to stabilize the operation of the system.

In accordance with a more specific aspect of the present invention, the rotative arm assembly is affixed to the actuator piston so that the arms extend radially in relation to the piston. A bearing on one of the arms then rides on the stationary linear cam to translate movement of the piston into rotative displacement of the arm assembly. Another arm of the assembly carries a second bearing which mates with a groove inside a cylinder, to revolve the cylinder which is coupled to apply the motion to the control structure as feedback to stabilize the system as the actuator is driven in response to commands.

Referring now to FIGURE 1, a portion of the system is shown in schematic form while the other portion is shown in perspective. Such division serves only to illustrate the system, and it is to be understood that the system may be constructed and housed variously depending upon the requirement of each particular application. For example, the system may be constructed in a single block housing containing the various elements and fluid-flow passages.

In the system as shown, a control valve 10 applies fluid presses to an actuator 12 to position a shaft 14 in accordance with command signals that control the valve 10 through a flapper assembly 16. The position of the shaft 14 is sensed by a rotative arm assembly 18 and applied to the flapper assembly as control feedback.

The basic operation of a hydraulic control valve with an associated flapper assembly and actuator is well-known in the prior art. Therefore, this operation will only be somewhat generally described. Control action originates in the system at the flapper assembly 16, which incorporates a flapper 20, controlled as described below, to be variously positioned between a pair of opposed facing nozzles 22 and 24 and to in turn control the valve 10. Hydraulic fluid, under pressure, from a source thereof (not shown) is supplied to the nozzles 22 and 24 through orifices 26 and 28 and passages 30 and 32 respectively. The quiescent position of the flapper 20 is intermediate the nozzles 22 and 24. Permitting equal flow therefrom to maintain equal pressures in the passages 30 and 32. When the condition of equal pressure in these passages 30 and 32 exists, balanced pressures also exist at the internal ends 34 and 36 of a cylinder 38, containing a spool valve 40 which comprises the control valve 10.

The spool valve 40 is longitudinally movable within the cylinder 38 so as to be displaced in response to differentials between the pressures at the ends 34 and 36 of the cylinder. The movement of the spool valve 40 in either direction from the quiescent position as shown applies power to the actuator 12 through hydraulic passages 42 and 44 interconnecting the actuator 12 and the control valve 10. As a result, the cylinder 46 of the actuator 12 is oppositely pressurized and relieved at the head and drive ends to displace a piston 48 connected to the shaft 14 which is in turn conventionally connected to a load (not shown).

The fluid force to drive the actuator 12, acting under control of the control valve 10 is received from a source of fluid under pressure (not shown) in a passage 50 that is connected to ports 52 and 54 in the cylinder 38 which lie at the edges of a land 56 of the spool valve 40. A relieving passage, or return conduit 58 is connected from from ports 60 and 62, under lands 64 and 66 respectively, to a fluid reservoir (not shown).

In the operation of the control valve 10, displacement of the spool valve 40 to the right connects the head end of the cylinder 46 to the low-pressure fluid reservoir through the port 62 and the conduit 58. In the same instance, the drive end of the cylinder 46 is connected through the passage 44 and the port 52 to the source of hydraulic fluid under pressure through the passage 50. The resulting pressure differential across the piston 48 urges the drive shaft 14 to the left to accomplish the desired displacement. Of course, a displacement of the spool valve 40 in the other direction in response to a command by the flapper assembly 16, accomplishes an opposite movement of the shaft 14 due to opposite pressurization and relief of the actuator 12.

It should thus be seen that the application of power to the load that is connected to the actuator 12 is controlled in accordance with movements of the flapper 20 to one position or another to various degrees. This movement of the flapper 20 may be initiated or controlled in a variety of ways. However, it is generally important to apply a servo or feedback force to the flapper 20 which opposes the command signal force and manifests accomplishment of the command, in order to stabilize the system. The present invention is somewhat generally directed to a structure for applying the feedback force as from the actuator shaft 14 to the flapper 20.

Considering the control structure for variously positioning the flapper 20, a torque motor 64 translates command signals to forces applied to the flapper 20. Torque motors for such purposes are well known in the prior art and therefore, the motor 64 is not shown in detail. The motor may include a pair of permanent magnet pole pieces and an electrical coil that provides a magnetic field in response to an electrical command signal applied across the terminals 66. The combined magnetic forces of the coil and the magnets act on an armature 68 held in a pivot mount 70, to pivotally displace the flapper 20 affixed at the end of the armature, and thus control flow from the nozzles 22 and 24 to accomplish the commanded operations of the actuator 12 as described above. Feedback stabilization of the flapper is accomplished by a mechanical linkage as will now be considered.

The cylindrical plunger or actuator shaft 14 telescopically receives an elongate cam drum 72 which extends from the head end of the actuator through a hydraulic seal and a bearing 74 (FIGURE 5) to be fixed in a stationary collar 76. The drum 72, fixed for relative movement of the actuator shaft 14, carries an elongate linear cam surface 78 extending in the direction of movement of the actuator 14. The cam surface 78 receivingly engages a roller bearing 80 of the rotative arm assembly 18 which is affixed to the end of the cylindrical actuator shaft 14. The roller bearing 80 is rotatively affixed at the end of one arm 82 of a stub shaft 83 that is held radial to the shaft 14 by an extension 84 from a collar 86. The opposed arm 88 of the stub shaft 83 carries a roller bearing 90 that mates with an elongate groove 92 defined inside a coupling cylinder 94 and which groove extends parallel the axis of the cylinder. The coupling cylinder 94 provides the translated motion without axial displacement.

The extension 84 from the collar 86 carrying the bearings 80 and 90 is integral with the collar 86 which is fixed on the actuator shaft 14 for relative rotation. That is, the collar 86 (FIGURE 6) has an annular internal ridge 96 that is matingly received in an exterior annular groove adjacent the end of the shaft 14. The ridge 96 slides within the groove thus permitting the collar 86 to rotate on the shaft 14. Therefore, sliding motion of the collar 86 about the shaft 14 accomodates rotation of the arm assembly 18 motivated through the cam surface 78. As the arm assembly 18 rotates, the coupling cylinder 94 is revolved by the roller bearing 90. The revolution of the cylinder 94 is facilitated by bearings as the bearing 74 (FIGURE 5) which includes a ring of balls 98 contained in a bearing race 100.

The end of the cylinder 94 (FIGURE 1) remote the bearing 74 carries a coil spring 102 wrapped about the cylinder and having one end connected thereto while the other end 104 is anchored. The spring 102 functions to bias the arm assembly 18, holding the roller bearing 80 against the cam surface 78.

Exterior of the cylinder 94, a pair of brackets 106, integral with the cylinder, engage the lower end of a feedback leaf spring 108, the upper end of which is rigidly affixed to the flapper armature 68. Therefore rotational displacement of the cylinder 94 applies a somewhat proportionate feedback force through the spring 108 to the flapper 20.

Considering an exemplary operation of the system, assume the application of an electrical signal to the terminals 66, to command movement of the flapper 20 to the right or forward in FIGURE 1 as the elements are shown. Such movement by the flapper 20 obstructs the flow of fluid from the nozzle 24 while permitting increased flow from the nozzle 22. Regarding fluid dispensed from the nozzles 20 and 24, a housing will normally be provided to receive and return the fluid to a reservoir; however, regardless, the variation in the nozzle flow rates as assumed results in an increased pressure in the passage 32 and a reduced pressure in the passage 30 which pressure differential is applied to the ends of the spool valve 40, moving it to the left. Displacement of the spool valve 40 to the left connects the passage 42 to the pressure source port 54 and connects the passage 44 to the reservoir port 60. As a result, the passage 42 connected to the head end of the actuator cylinder 46 is pressurized while the drive end, connected to the passage 44 is relieved. The resulting action is displacement of the actuator shaft 14 to the right or somewhat rearward as shown, to drive the load (not shown) in accordance with the assumed command signal.

As the actuator shaft 14 moves to the right, sliding in the sealed cylinder 46, it is withdrawn from a portion of the stationary drum 72 travelling the arm assembly 18 to the right relative the drum 72. In such motion, the arm assembly moves from a quiescent position on the cam surface 78 as shown in FIGURE 2 to a position as shown in FIGURE 3. That is the roller bearing 80, spring biased toward the cam surface 78, is shifted in a circular orbit, i.e. revolved from one radial position to another (clockwise as shown in FIGURES 2 and 3).

The orbital change by the arm assembly 18 as described revolves the cylinder 94 in a clockwise direction as shown in the sectional views as taken, which applies a force to the flapper 20 through the spring 108 tending to oppose the assumed command movement toward the nozzle 24. Thus a feedback force is applied to the flapper 20, indicative of the magnitude of the accomplished displacement and opposed to the force of the commanding signal. This feedback force returns flapper 20 to neutral position.

It should be understood that a displacement of the flapper 20 opposite to that assumed above, i.e. toward the nozzle 22, results in a sequence of motion to displace the arm assembly 18 counterclockwise as shown in FIGURE 4 with the result that the mechanical feedback force applied through the cylinder 94 and the spring 108 urges the flapper 20 away from the nozzle 22, again tending to compensate the assumed displacement.

One of the important features of the present invention resides in the consideration that displacements of considerable length by the actuator shaft 14 are accurately reduced to very small displacements of the cylinder 94 which are nicely suited for use as mechanical feedback forces. In one embodiment of the invention, reliable conversion from an actuator stroke of 14 inches to a feedback displacement of less than one quarter inch is accomplished within close tolerance. Furthermore, this structure lends itself to mass production techniques without extreme costs. That is, the system avoids complex reduction gears and linkages which normally impart some lost motion or "backlash" and also are expensive to manufacture as well as generally requiring substantial maintenance.

Three principle components of the feedback linkage, i.e. the cam member or drum 72, the rotative linkage, or arm assembly 18 and the output coupling or cylinder 94, not only are simple in manufacture but furthermore are components that occupy relatively small space avoiding the need for long lever arms or other bulky feedback structures of the prior art.

Another advantage of a structure of the present invention is that the entire structure can be mass balanced, i.e. the structural mass can be symmetrical about the center of mass. As a result, units can be manufactured to be less sensitive to vibrations as may be imparted from the device in which the structure is housed.

It should also be recognized that the feedback of the system can be varied or compensated in accordance with the position of the actuator shaft 14, by imparting a selected curvature to the cam surface 78. That is, if the cam surface is linearly related along the length of the drum 72, feedback may be linearly related to actuator displacement; however, if the cam surfaces are variously curved, a non-linear relationship can be accomplished.

There has been disclosed a hydraulic control system having an effective feedback linkage which is economical to use and manufacture and is accurate in operation. However, it should be understood that the scope of the invention is not to be limited to the embodiment described, but rather is to be defined in accordance with the following claims.

What is claimed is:
1. A mechanical linkage for coupling a drive member to a driven member, comprising:
   a rotative assembly means including extending arms;
   a member having a cam surface engaging one extending arm of said assembly;
   means for imparting relative motion between said member having a cam surface and said rotative assembly means, whereby said one extending arm is variously positioned on said cam surface according to movement of said drive member and whereby said rotative assembly means is rotatively moved; and
   a coupling means defining an elongate surface receiving the other extending arm of said rotative assembly whereby rotative motion of said assembly is imparted to said driven member.

2. A structure according to claim 1 wherein said coupling means comprises means defining an elongate groove to matingly receive said other extending arm, whereby to immovably receive motion by said rotative assembly along the length of said groove.

3. A structure according to claim 1 wherein said means for imparting relative motion includes means affixing said rotative assembly to a cylindrical-shaft drive member whereby said extending arms are rotated in an orbit and extend radially of said drive member.

4. A mechanical linkage for coupling a drive member to a driven member, comprising:
   a plunger member adapted to be affixed to said drive member for movement along a linear path;
   a rotative assembly means including extending arms, affixed to said plunger member;
   a cam member having a cam surface extending parallel to said linear path, said surface engaging one extending arm of said assembly whereby said one extending arm is variously positioned on said cam surface by movement of said plunger member relative said cam member to rotatively move said rotative assembly means; and
   a coupling means adapted to be connected to said driven member, defining an elongate slot extending parallel to said linear path, said slot receiving the other extending arm of said assembly whereby rotative motion of said assembly means is imparted to said driven member.

5. A mechanical linkage for coupling a drive member to a driven member, comprising:
   a plunger member adapted to be affixed to said drive member for movement along a linear path;
   a rotative assembly means affixed to said plunger member including arms extending generally radially to said linear path;
   bearing means affixed to said arms;
   a cam member having a cam surface extending parallel to said linear path, said surface engaging one extending arm of said assembly, whereby said one extending arm is variously positioned on said cam surface by movement of said plunger member relative said cam member to rotatively move said rotative assembly means; and
   a coupling means adapted to be connected to said driven member, defining an elongate slot extending parallel to said linear path, said slot receiving the other extending arm of said assembly whereby rotative motion of said assembly means is imparted to said driven member.

6. A mechanical linkage for coupling a drive member to a driven member, comprising:
   a plunger member adapted to be affixed to said drive member for movement along a linear path;
   a rotative assembly means affixed to said plunger member including arms extending generally radially to said linear path;
   bearing means affixed to said arms;
   a drum having a cam surface extending in the direction of said linear path and fixed for relative movement by said plunger member, said cam surface engaging the bearing means affixed to one of said arms whereby to variously rotate said rotative assembly means in accordance with the position of said plunger member; and
   a coupling means adapted to be connected to said driven member, defining an elongate slot extending parallel to said linear path, said slot receiving the other extending arm of said assembly whereby rotative motion of said assembly means is imparted to said driven member.

7. A mechanical linkage for translating a movement by a drive member along one axis to reduced motion by a driven member in a plane substantially perpendicular said one axis comprising:
   a plunger member adapted to be affixed to said drive member for movement along a linear path;
   a transverse assembly rotatively affixed to said plunger to extend radially relative to said plunger and including first and second arms extending in opposed directions;

a first bearing means affixed to the end of said first arm; a second bearing means affixed to the end of said second arm;

a drum having a cam surface extending in the direction of said linear path and fixed for relative movement by said plunger member, said cam surface engaging the bearing means affixed to one of said arms whereby to variously rotate said rotative assembly means in accordance with the position of said plunger member; and a cylindrical coupling rotatively mounted about said cam member and having an internal groove extending somewhat perpendicular said plane, said groove matingly receiving said bearing means affixed the second of said arms.

8. A structure according to claim 7 further including spring means to urge said first bearing means in contact with said cam surface.

9. A structure according to claim 7 wherein said first and second arms are fixed to said plunger member whereby to rotate in an orbital pattern.

10. A hydraulic fluid system comprising:
a hydraulic control means including a valve member movable relative to a fixed reference for controlling hydraulic fluid;
an actuator means connected to be variously positioned by said hydraulic fluid relative said fixed reference;
a rotative arm assembly means including a pair of extending arms;
a member having a cam surface engaging one extending arm of said assembly;
and a coupling means defining an elongate surface receiving the other extending arm of said rotative arm assembly whereby rotative motion of said assembly is imparted to said valve member.

11. A hydraulic fluid system according to claim 10 wherein said hydraulic control means includes an electrically-operated flapper valve structure and a spool valve controlled thereby whereby to control said hydraulic fluid.

12. A hydraulic fluid control system according to claim 10 wherein said cam surface is curved relative the axis thereof to accomplish a non-linear relationship between said actuator means and said coupling means.

13. A structure according to claim 10 wherein said coupling means includes a feedback spring for applying a force to said valve member that is related to the displacement of said arm assembly means.

References Cited by the Examiner
UNITED STATES PATENTS

| | | | |
|---|---|---|---|
| 2,250,734 | 7/1941 | Thompson et al. | 74—89 |
| 2,824,548 | 2/1958 | Roche et al. | 91—387 |
| 2,989,871 | 6/1961 | Straub et al. | 74—99 |
| 3,018,763 | 1/1962 | Goerke | 91—387 |
| 3,065,735 | 11/1962 | Chaves et al. | 91—387 |

MARTIN P. SCHWADRON, *Primary Examiner.*

PAUL E. MASLOUSKY, *Examiner.*